United States Patent [19]

Bron

[11] 4,325,406
[45] Apr. 20, 1982

[54] CONTINUOUS FLUID PRESSURE CONTROL DEVICE AND SYSTEM

[76] Inventor: Dan Bron, 36 Palmach St., Haifa, Israel

[21] Appl. No.: 169,277

[22] Filed: Jul. 16, 1980

Related U.S. Application Data

[63] Continuation of Ser. No. 943,852, Sep. 19, 1978, abandoned.

[30] Foreign Application Priority Data

Sep. 20, 1977 [IL] Israel .................................. 52,954

[51] Int. Cl.³ ............................................ F16K 11/07
[52] U.S. Cl. ............................. 137/492.5; 137/625.66; 137/625.69
[58] Field of Search .................... 137/488, 492, 492.5, 137/625.66, 625.69

[56] References Cited

U.S. PATENT DOCUMENTS

| | | | |
|---|---|---|---|
| 923,568 | 6/1909 | Nicola | 137/492 X |
| 1,177,864 | 4/1916 | Hodgdon | 137/492 |
| 2,877,791 | 3/1959 | Rich | 137/492 X |
| 3,746,047 | 7/1973 | Peters | 137/625.66 |
| 3,877,484 | 4/1975 | Theriot | 137/625.66 |

*Primary Examiner*—Alan Cohan

*Attorney, Agent, or Firm*—Lane, Aitken, Kice & Kananen

[57] ABSTRACT

A device and a system for controlling a fluid pressure are provided. The device comprises a spooltype pilot valve including a housing, a spring-biased displaceable elongated member having an innermost and an outermost sealing means defining at least one fluid-tight annular chamber between an outer surface of the member and an inner surface of the housing and having shoulder means dividing the housing into two further, substantially cylindrical chambers. The pilot valve further includes a first opening communicating with one of said cylindrical chambers at one side of said shoulder means for effecting the displacement of said member, a second opening communicating with said annular chamber, a third opening situated in very close proximity to, and on one side of, the outermost sealing means, and two venting openings. The arrangement being such that when the fluid pressure at the first opening exceeds a predetermined value, the displaceable member is moved to create a flow path between the third opening and one of the other openings of the housing, via the annular chamber to thereby cause the pressure at the first opening to recede to its predetermined value, to allow the spring bias to return the member to its original position.

5 Claims, 3 Drawing Figures

CONTINUOUS FLUID PRESSURE CONTROL DEVICE AND SYSTEM

This application is a continuation of application Ser. No. 943,852, filed 9/19/78, abandoned.

BACKGROUND OF THE INVENTION

The present invention relates to a continuous fluid-pressure control device and to a fluid-pressure control system in a fluid line employing said device for regulating the fluid pressure to maintain a constant predetermined pressure in the line.

A problem frequently encountered in fluid systems, such as, for example, irrigation networks, is the need to supply water at a constant pressure lower than the mains pressure, but independent of fluctuations in the latter. There are known in the art various types of reduction valves which are used for this purpose, all of which, however, are bulky and costly affairs, and some of which even require an extraneous power supply for their operation. Most of them are also easily fouled by impurities in the water.

It is the object of the invention to overcome these difficulties and drawbacks and to provide a fluid-pressure regulator which is simple in design, inexpensive, and reliable in operation.

SUMMARY OF THE INVENTION

In accordance with the invention, there is provided a continuous fluid-pressure control device comprising a spool-type pilot valve including a housing, a spring-biased displaceable elongated member having an innermost and an outermost sealing means defining at least one fluid-tight annular chamber between an outer surface of said member and an inner surface of said housing and having shoulder means dividing said housing into two further, substantially cylindrical chambers, said pilot valve further including a first opening communicating with one of said cylindrical chambers at one side of said shoulder means for effecting the displacement of said member, a second opening communicating with said annular chamber, a third opening situated in very close proximity to, and on one side of, said outermost sealing means, and two venting openings, the arrangement being such that when the fluid pressure at the first opening exceeds a predetermined value, said displaceable member is moved to create a flow path between said third opening and one of the other openings of said housing, via said annular chamber to thereby cause the pressure of said first opening to recede to its predetermined valve, to allow said spring bias to return said member to its original position.

The invention further provides a fluid-pressure control system comprising in combination:

a fluid-operated control means mountable in a fluid line and including obturating means, and a continuous fluid-pressure control device comprising a spool-type pilot valve including a housing, a spring-biased, displaceable, elongated member having sealing means defining at least one fluid-tight chamber between an outer surface of said member and an inner surface of said housing, said pilot valve further including a first opening communicating with a downstream portion of said pilot valve for effecting the displacement of said member, a second opening communicating with an upstream portion of said control valve, a third opening communicating with the control chamber of said control valve and two venting openings;

the arrangement being such that when the fluid pressure in the downstream portion of said control valve exceeds a predetermined value, said displaceable member is moved to create a flow path between said third opening and one of the other openings of said housing to effect a change of pressure in said control chamber, whereby a controlled movement of said obturating means is effected.

BRIEF DESCRIPTION OF THE DRAWINGS

In order that the invention may be understood more fully, reference should be had to the following illustrative embodiments read in conjunction with the accompanying figures in which:

In FIG. 1 there is shown a control valve generally indicated by the numeral 2, mounted in a fluid line 4 having an upstream portion indicated by the letter H and a downstream portion indicated by the letter L which letters stand for the common designation of "High" and "Low". The control valve 2 consists of an obturator means 6 and a stem 8 leading to piston 10 moveable in a control chamber 12. Operationally coupled to the control valve and to the upstream and downstream portions of the line, immediately adjacent to the control valve 2, is a spool-type pilot valve 14. The pilot valve 14 includes a two-part housing 16, encasing a displaceable elongated member 18 biased by a spring 20 bearing against shoulder means 22 affixed at one end to the member and displaceable within a substantially cylindrical chamber 23. Adjacent to its other end, member 18 carries two spaced-apart, ring-like seals 24, defining a fluid-tight annular chamber 26 therebetween and between the outer and inner surfaces of the member and the housing, respectively. The shoulder means 22 is similarly provided with a sealing ring 28. The pilot valve 14 further includes a first opening 30 communicating via conduit 32 with a downstream portion L of the fluid line 4, a second opening 34 communicating through conduit 36 with an upstream portion H of the fluid line 4 and a third opening 38 communicating via conduit 40 with the control chamber 12. A fourth opening 42 in the housing as well as opening 44 serve as venting openings. Alternatively, opening 34 may be connected to any suitable high pressure source and likewise opening 44 may be connected with an extraneous pressure which is adapted to act as a bias in addition to the spring 20.

Figure 1:
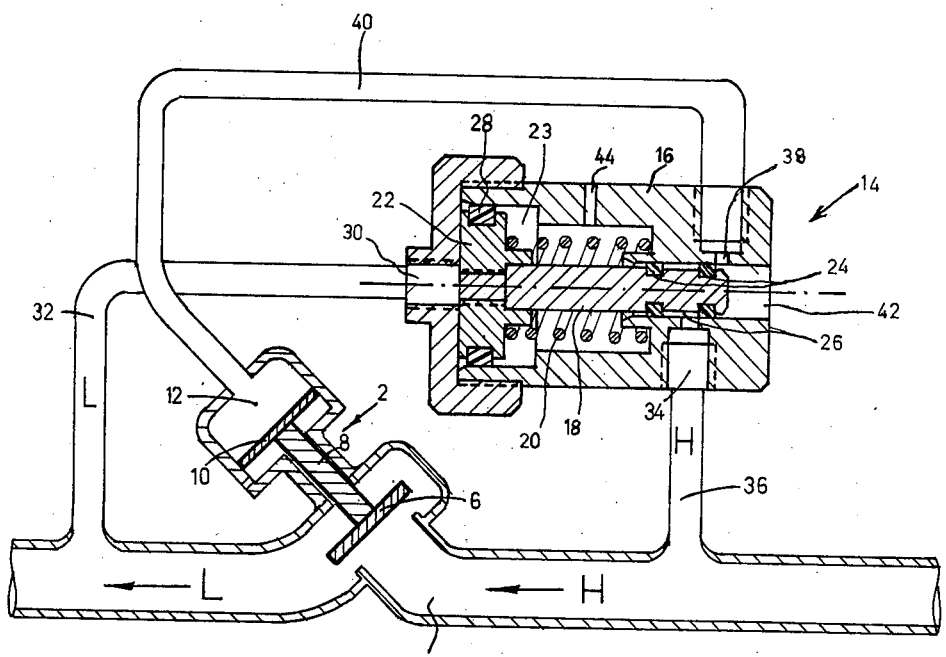
FIG. 1 is a cross sectional view of an embodiment of a control system according to the present invention.

The compression of the spring 20 can be adjusted by the extent to which the two housing parts are threadably engaged with each other.

In operation, as the fluid pressure in the downstream portion L exceeds a predetermined value as governed by the force applied by the spring 20, the fluid under pressure flowing via conduit 32 will enter opening 30, impinge on member 22 and cause the displacement of the member in a direction towards the opening 42, whereby the outermost sealing ring 24 is made to slide past the opening 38.

Opening 38 which is normally vented will thus be exposed to the fluid-tight chamber 26 and consequently fluid from the upstream portion H which flows via conduit 36 into opening 34 and thereafter into chamber 26 will, in turn, pass through opening 38 and conduit 40, enter the control chamber 12 and impinge on the piston 10 to partly close the obturating means 6, with the result that the pressure in the downstream portion L will drop to its predetermined value.

Similarly, when the pressure in the downstream portion L of the line drops below its predetermined value, the spring 20 will cause the displacement of member 18 towards the opening 30, thus exposing the opening 38 to the venting opening 42. The fluid pressure on the obturating means 6 will thus need only to move said means 6 against the atmospheric pressure to enlarge the fluid passageway thereby raising the pressure in the downstream portion L.

Figure 2:
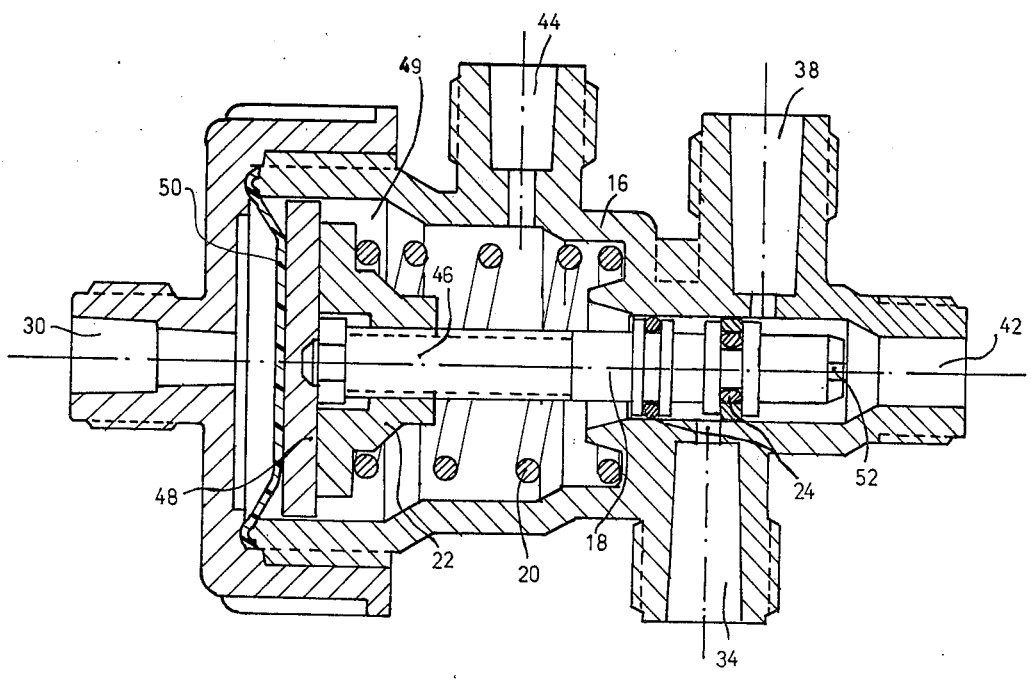
FIG. 2 is a cross sectional view of a different embodiment of a spool-type control valve utilized in the system according to the invention.

A slightly modified structure of the pilot valve is shown in FIG. 2. As the pilot valve is adapted to be interconnected with a control valve in the same manner as in FIG. 1, for simplicity only the pilot valve is shown and like parts are marked with the same indicating numerals. As seen, the elongated member 18 is threadably coupled to the shoulder means 22 and has an end portion 46 protruding therethrough and engaging a plate element 48 abutting against a flexible diaphragm 50. The free end of member 18 is slotted at 52 to facilitate the turning of member 18 in the shoulder means 22. The threading of the member 18 adjusts the positioning of the shoulder means 22 therealong and inside the chamber 49 and in turn adjusts the compression of the spring 20. The strength of the spring in its resting state determines the predetermined pressure required to displace the member 18, and hence, the outermost sealing ring 24 from its position on the left of control opening 38, as shown in FIG. 2 to a position on the right of said opening.

Figure 3:
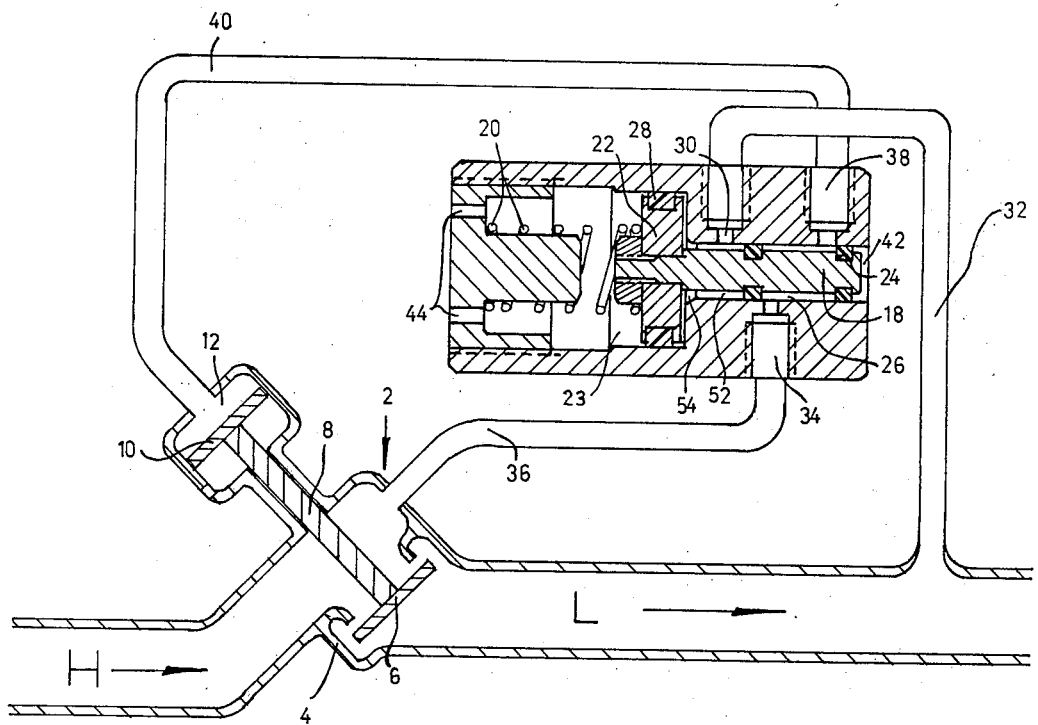
FIG. 3 is a cross sectional view of still a further embodiment of a system according to the present invention.

Turning now to FIG. 3, there is shown another embodiment of a control valve system in which the control valve 2 is installed in the fluid line 4 in an opposite direction relative to the installation of FIG. 1. Also, as seen in the figure, according to this embodiment the opening 30 through which the fluid effecting the displacement of member 18 enters, is positioned substantially perpendicular to the axis of member 18, instead of axially therewith as to the previous embodiments. Furthermore, in addition to the chamber 26 which is formed between the sealing rings 24, there is formed another chamber 52 between the innermost sealing ring 24 and the shoulder means 22. In order to obtain a larger surface area on the shoulder means 22 against which the fluid passing through opening 30 will initially impinge, chamber 52 is provided with an annular enlargement 54. The operation of this system is similar to the operation of the previously discussed systems. As the fluid pressure in the downstream portion L increases, the fluid passing through conduit 32 and the opening 30 will enter chamber 52, impinge on the holder means 22 and hence cause a movement of the member 18 against the force of the spring 20. As the outermost sealing ring 24 will slip past the opening 38, the latter will be exposed to the venting opening 42 and hence, the fluid pressure in the downstream portion L will effect the movement of the obturating means 6 in a direction restricting the passageway.

Here again, for given constant parameters of a system, the force of the spring 20 will determine the controlling point and thus said point can be threadably adjusted by the two parts of the housing to preset the initial compression of the spring and thus the force which it normally exerts on the shoulder means 22 and, in turn, on member 18.

While particular embodiments of the invention have been described and shown with reference to the figures, it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An adjustable fluid-pressure control system comprising in combination:

a fluid-operated control valve mountable in a fluid line, including obturating means and means movable within a control chamber for displacing said obturating means in response to pressure and, a continuously acting spool-type pilot valve comprising a housing having two parts removably inter-connected with each other, and having a first opening communicating with a downstream portion of said fluid line;

a second opening communicating with an upstream portion of said fluid line;

a third opening communicating with the control chamber of said control valve;

a first and a second venting opening leading to the outside of said pilot valve;

a flexible diaphragm clamped along its peripheral edge betweeen said housing parts, dividing the interior of said housing into a first and a second chamber;

a plate member disposed in said second chamber, slidably fitting a portion thereof, and abutting said flexible diaphragm;

an elongated member, one end of which abuts against, and is centered and rotatably supported by said plate member, said elongated member having adjacent to its other end two spaced-apart sealing means defining a fluid-tight third chamber between an outer surface of said member and an inner surface of one of said housing parts, said elongated member being further provided with an external thread extending over at least a part of that portion of said member which is closer to said first end, and drive means at said second end permitting said member to be rotated from the outside of said pilot valve;

shoulder means disposed in said second chamber, having an internal thread by means of which it is at least partly threaded onto the threaded portion of said elongated member;

a spring disposed in said second chamber and interposed between said shoulder means and an abutment surface of said second chamber, said spring serving as a reference force, which force is adjustable by rotation of said elongated member;

the arrangement being such that when the fluid pressure in the downstream portion of said obturating means exceeds a predetermined value, said elongated member is moved in response to pressure at said first opening to alter the flow path between said third opening and one of the other openings of said housing to effect a change of pressure in said control chamber, whereby a controlled movement of said obturating means is effected to maintain the constancy of the pressure in said line.

2. The system according to claim 1, wherein said first venting opening communicated with said second chamber.

3. The system according to claim 1, wherein said second venting opening normally communicates via said inner surface with said third opening.

4. The system according to claim 1, wherein said second venting opening is in axial continuation of said inner surface of said housing part, and provides access to said drive means, facilitating rotation of said elongated member.

5. The system according to claim 1, wherein said first venting opening is connected to an external pressure source to modify the biasing force of said spring.

* * * * *